United States Patent [19]

Burgess et al.

[11] Patent Number: 4,575,363
[45] Date of Patent: Mar. 11, 1986

[54] DRIVE PULLEY

[75] Inventors: Geoffrey W. Burgess, Beloel; Denis Roy, Valcourt, both of Canada

[73] Assignee: Bombardier Inc., Valcourt, Canada

[21] Appl. No.: 585,446

[22] Filed: Mar. 2, 1984

[51] Int. Cl.⁴ ............................................. F16H 11/06
[52] U.S. Cl. ..................................................... 474/14
[58] Field of Search ............................... 474/13, 14, 11

[56] References Cited

U.S. PATENT DOCUMENTS

| | | | |
|---|---|---|---|
| 3,230,787 | 1/1966 | Siegal | 474/14 |
| 3,597,987 | 8/1971 | Kiekhaefer | 474/14 |
| 3,727,478 | 4/1973 | Erickson et al. | 474/14 |
| 3,759,111 | 9/1973 | Hoff | 474/14 |
| 3,971,263 | 7/1976 | Beaudoin et al. | 474/14 |
| 4,052,908 | 10/1977 | Takagi et al. | 474/14 |
| 4,095,479 | 6/1978 | Lundberg | 474/14 |
| 4,313,728 | 2/1982 | Prasad | 474/14 |

Primary Examiner—James A. Leppink
Assistant Examiner—Frank McKenzie
Attorney, Agent, or Firm—Larson and Taylor

[57] ABSTRACT

A variable ratio drive pulley, of the type employed in snowmobiles to transmit a drive from the snowmobile engine via a belt transmission to the snowmobile track, has a fixed flanged and an opposed movable flange which co-operate to drive the belt. The movable flange is spring loaded away from the fixed flange and centrifugal means are included to overcome the spring force and urge the movable flange towards the fixed flange with a force that increases with the speed of rotation. The centrifugal means comprises a number of pivoted levers each having a roller cooperating with a ramp, and the pulley includes means whereby the position of the ramp can be rapidly adjusted without disassembly of the drive pulley, to vary the response of the drive pulley to different operating conditions.

13 Claims, 9 Drawing Figures

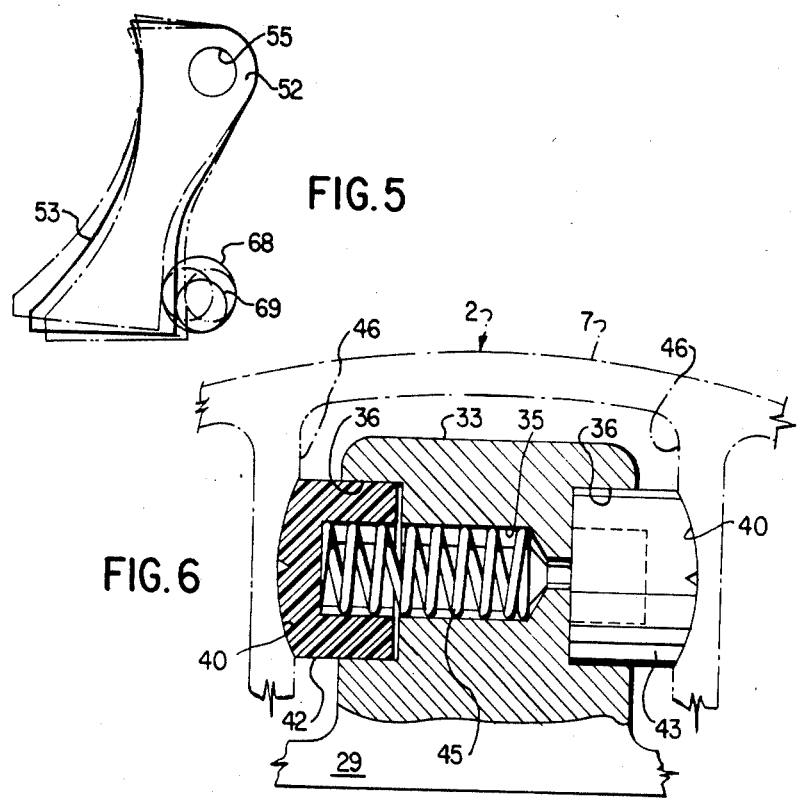
FIG. 5
FIG. 6
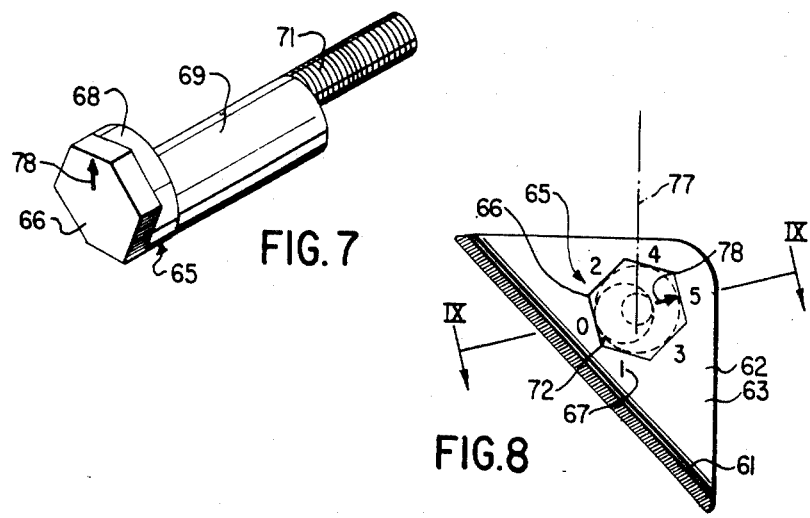
FIG. 7
FIG. 8

DRIVE PULLEY

BACKGROUND OF THE INVENTION

This invention relates to a new or improved variable ratio drive pulley of a type useful in snowmobiles, for example, to transmit driving power from the snowmobile engine to its track.

DESCRIPTION OF THE PRIOR ART

Numerous examples of variable ratio drive pulleys are known in the art. Typically, these comprise a pair of opposed fructo-conical flanges or sheaves mounted on the output shaft of the engine and arranged to apply a drive to an endless flexible belt positioned between the flanges. Both flanges rotate with the output shaft, one flange being axially fixed, and the other flange being axially shiftable towards and away from the fixed flange. Spring means are provided to urge the movable flange away from the fixed flange so that at idling or low engine speeds there is no driving contact between the flanges and the belt, and no torque is transmitted. To effect driving engagement between the flanges and the belt, such pulleys include centrifugally actuated weights, levers and the like which respond to increasing engine speeds to apply an axial force to the movable pulley flange to shift it against the spring towards the fixed flange and drivingly engage the belt between the flanges. The drive ratio is determined by the diameter of the belt path where it is engaged by the flanges, and varies with shifting of the movable flange towards or away from the fixed flange.

Examples of such variable ratio drive pulleys can be seen, inter alia, in U.S. Pat. Nos. 3,597,987 Kiekhaefer, 3,759,111 Hoff, 4,095,079 Lundburger and 4,313,728 Prasad. These normally employ a system of pivoted levers or weights cooperating with rollers or other followers and acting between the movable flange and a part fixed relative to the drive shaft. As the drive pulley rotates, the centrifugal force acting upon the pivoted weights or levers is converted into an axial thrust upon the movable flange, this thrust varying with the speed of rotation. The variation of the axial thrust with speed of rotation is controlled by the configuration and layout of the components, the mass of the cam levers or pivoted weights etc., and the design is generally chosen to be such that when the resultant axial thrust upon the movable flange has increased to a value sufficient to displace that flange towards the fixed flange, it remains substantially constant over a wide range of drive ratios of the drive pulley. The drive pulley is designed such that this constant thrust value corresponds to the engine speed at which maximum horsepower is developed, so that the engine can operate more or less continuously at that speed, the drive ratio varying in response to the load requirements.

Thus, such variable ratio drive pulleys are normally designed for use with one particular engine and must be modified substantially for use in other applications. Such modification can be effected by varying the mass of the centrifugal weights, and/or the geometry of the cam levers and followers employed. However, hitherto, such variations have been complicated, and generally have required substantially total disassembly of the drive pulley and the addition or replacement of individual components. For example in U.S. Pat. No. 3,759,111 Hoff the axial thrust is generated by cam levers pivoted on the rear of the movable flange cooperating with cam following rollers carried on a spider fixed axially with respect to the drive shaft. To provide different centrifugal-response characteristics in this drive pulley, spacer rings are employed to adjust the position of the spider axially of the drive shaft. However this adjustment is not readily accomplished since the drive pulley must be taken apart to enable replacement of the spacer rings. In other arrangements the pivoted levers or ramp are replaced by members having different characteristics.

SUMMARY OF THE INVENTION

It is an object of the invention to provide a variable ratio drive pulley of the type described in which the centrifical-response characteristic can be readily adjusted without difficulty, and without the requirement for disassembly of the drive pulley.

The invention provides a variable ratio drive pulley comprising: two opposed frusto-conical flanges arranged co-axially with respect to a drive shaft to rotate therewith and impart a variable ratio drive to a transmission belt arranged between the flanges;

one said flange comprising a fixed flange that is fixed axially relative to said shaft, and the other said flange being a movable flange that is movable axially of said shaft towards and away from said fixed flange;

biassing means operatively arranged between said shaft and said movable flange to urge the latter axially away from said fixed flange; and centrifugal means acting between said movable flange and a part fixed relative to said shaft and responsive to rotation of said drive pulley to generate an axial thrust on said movable flange urging it towards said fixed flange, such axial thrust increasing with the speed of rotation until it reaches a value sufficient to overcome the force of said biassing means and displace said movable flange axially towards said fixed flange;

wherein said pulley includes adjustment means engaging said centrifugal means and selectively settable to vary the axial thrust response characteristics of the pulley.

In one preferred configuration the centrifugal means is in the form of a set of pivoted weight levers each cooperating with a contoured ramp, the levers and ramps being positioned within a casing defined between the movable flange and a cup enclosing the rear side of that flange. The adjustment means is accessible for adjustment purposes from the exterior of the cup. More specifically, in this arrangement the cup is fixed in relation to the drive shaft and is received within a cylindrical skirt extending from the rear face of the movable flange. Each weight lever is pivoted on the movable flange and cooperates with a respective contoured ramp that is supported by the cup and extends in a somewhat radial direction with respect to the drive shaft axis. The radially inner end of the ramp is carried in a stiff pivotal mounting, and the outer end of the ramp rests against an adjustable abutment supported in the cup. The abutment is provided by an eccentric pin rotatable on axis at right angles to the drive shaft axis and carried in a bearing structure formed in a shoulder projecting on the outer side of the cup. In one preferred configuration, the eccentric pin is clamped in non-rotating relationship in the bearing structure, but can be inserted therein in a plurality of different angular orientations, each corresponding to a different position of abutment between the pin and the ramp. As disclosed, the eccentric pin has a hexagonal head which is received in a complementary hexagonal socket in the outer surface of the shoulder. This hexagonal head includes indicating means which may be registered with markings on the shoulder to give an indication of the orientation of the pin.

In this arrangement, there are six different possible orientations of the pin corresponding to six positions of adjustment of the abutment, each providing a slightly different positioning of the contoured ramp, and accordingly providing an adjustment in the response characteristics of the drive pulley. The number of positions adjustment may be selected to be greater or less than six, as desired. It would be possible to arrange for the eccentric pin to be continously adjustable, but in that event it would be necessary to provide extremely reliable clamping means to ensure that the pin did not shift in position once adjusted. Provision could also be made for adjustment of the ramp to be effected by remote control methods, e.g. electrically.

In an alternative configuration, the eccentric pin could be replaced by an adjustment pin having a series of flat abutment surfaces around its periphery, each spaced at a different distance from the axis of the pin. In this arrangement the interaction of the ramp with the selected flat abutment surface would tend to prevent unintentional displacement of the pin from the selected position of adjustment.

BRIEF DESCRIPTION OF THE DRAWINGS

The invention will further be described, by way of example only, with reference to the accompanying drawings wherein:

FIG. 5 is a somewhat schematic view showing a detail of the adjustment of the drive pulley;

FIG. 6 is an enlarged sectional view taken generally on the line VI—VI in FIG. 1;

FIG. 7 is an enlarged prospective view of an adjustment pin employed in the drive pulley;

FIG. 8 is a fragmentary view in the direction of the arrows VIII—VIII in FIG. 3;

DESCRIPTION OF THE PREFERRED EMBODIMENT

Figure 1:
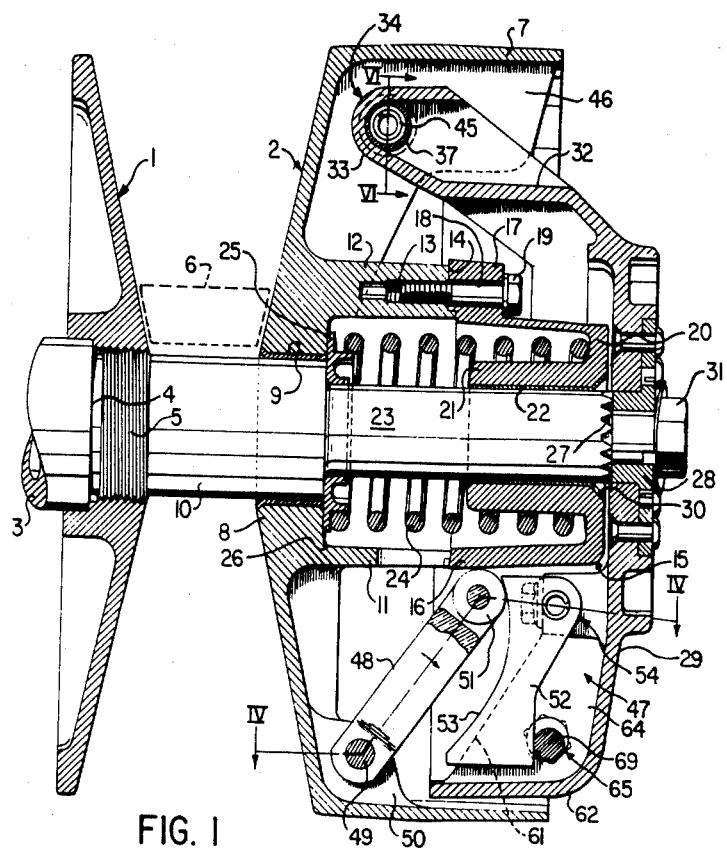
FIG. 1 is a longitudinal sectional view of a preferred embodiment of the variable ratio drive pulley, taken on the line I—I of FIG. 3.

As shown in section in FIG. 1, the variable ratio drive pulley comprises two frusto-conical flanges 1 and 2 co-axially arranged with respect to a drive shaft 3, which may be the output shaft of a snowmobile engine (not shown). Both flanges are arranged to rotate with the shaft, the flange 1 being axially fixed thereto and located against a shoulder 4 by threaded engagement with an externally screw-threaded section 5 of the shaft.

As will be described in the following, the flange 2 is axially movable with respect to the shaft 3, and the two flanges are adapted to cooperate in applying a driving engagement to an endless belt 6 of trapezoidal cross-section arranged between the flanges.

The movable flange 2 has a cylindrical peripheral skirt 7 projecting axially rearwardly thereof, and a central hub 8 defining a bore which carried a bushing 9 that slides on an intermediate section 10 of the shaft 3. Projecting from the rear side of the hub is an annular wall 11 having three thickened sections 12 arranged at equal angular intervals about the axis of the shaft 3, and each defining a screw-threaded axially directed bore 13 which opens to the end face 14 of the wall 11.

A spring cover 15 has a peripheral wall 16 in registering abutting relationship with the wall 11 and likewise formed with three thickened sections 17 having through bores 18 aligned with the bores 13 and each receiving the shank of a cap screw 19 which is threaded into the bore 13 to secure the cover 15 in place. The cover 15 has a closed end wall 20 that supports an inner cylindrical wall 21 which in turn seats a bushing 22 which is in sliding engagement with a reduced diameter end section 23 of the shaft 3.

Within the chamber formed by the walls 15 and 16 is arranged a coiled compression spring 24 one end of which is seated against the end wall 20, and the other end of which presses against an annular spring seat 25 which, in the condition shown in FIG. 1, is pressed by the force of the spring 24 against a shoulder 26 formed between the intermediate shaft section 10 and the end shaft section 23.

Figure 2:
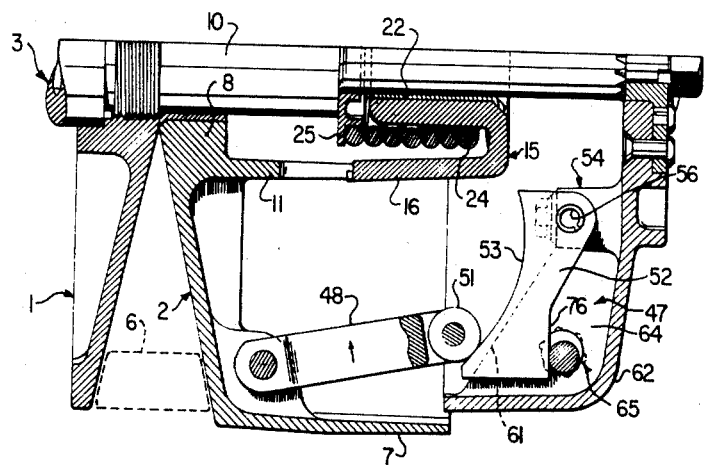
FIG. 2 is a view corresponding to FIG. 1, but showing only the lower half of the pulley and in a different condition of operation.

As will be evident from a comparison of FIGS. 1 and 2 of the drawings, axial displacement of the movable flange 2 towards the fixed flange 1 effects compression of the spring 24, the movable flange 22 being guided by sliding of the bushing 22 on the end section 23 of the shaft 3, and of the bushing 9 on the shaft section 10.

The rear side of the movable flange 2 is substantially enclosed by an end cover or cup 29 which has affixed thereto an apertured central torque flange 28. The facing ends of the torque flange 28 and the shaft 3 are serrated to define a Hirth-type coupling 27. The cup 29 is held in place by a bolt 31 that passes through the shaft 3 and is in threaded engagement with the engine crankshaft (not shown). The bolt 31 thus maintains the Hirth coupling in engagement so that the cup is fixed to rotate with the shaft 3. The cup 29 effectively closes the rear side of the movable flange 2 and forms therewith a casing, the outer portions of the cup being received within the cylindrical skirt 7.

Figure 3:
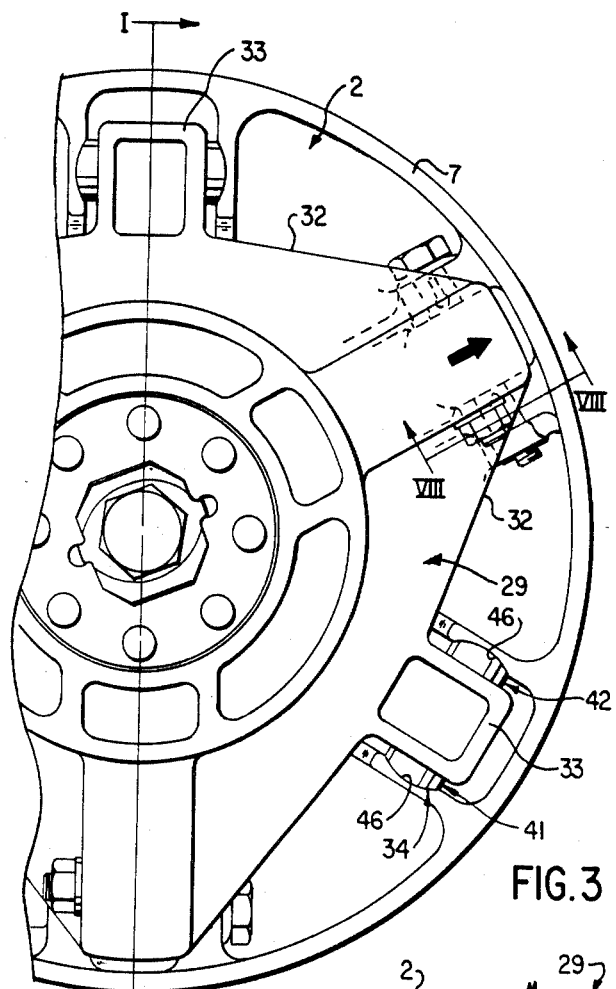
FIG. 3 is a partial view of the pulley when seen from the right hand side of FIG. 1.

As will be evident from FIG. 3, the cup 29 is of generally triangular configuration as seen in end view, having three sides 32 from the center of each of which extends an integral bracket 33 which projects radially outwardly and axially forwardly towards the rear side of the movable flange 2, as is clearly shown in FIG. 1. The brackets 33 are arranged at equal angular intervals about the axis of the shaft 3 and each is provided with torque transmitting and guidance means 34 adapted to provide a driving connection from the shaft 3 via the cup 29 to the movable flange 2, and also to provide axial guidance of the latter during its displacement.

As best seen in FIG. 6, the bracket 33 is hollow and has a transverse bore 35 extending tangentally with respect to the axis of the shaft 3, each end of the bore being formed with a slightly enlarged shallow counterbore 36. Bearing pads 42, 43 are received within the counterbores 36. Within the bore 35 is a spring 45, one end of which presses against the bearing pad 42 and the other end of which presses against a shoulder in the bore 35. The bearing pads 42, 43 each have a convex head, projecting axially out of the respective counterbore 36. The bearing pad 43 is fixed with respect to the bracket 33, whereas the pad 42 is axially movable, being slidably guided within the counterbore 36 and being urged outwardly by the force of the spring 45.

The bearing pads 42, 43 are formed of a suitable low-friction material such as nylon, and engage a pair of opposed parallel walls 46 projecting inwardly from the skirt 7 of the movable flange 2 and formed with concave grooves 40. These grooves 40 extend axially with respect to the shaft 3 and are in sliding contact with the bearing pads 42, 43 during axial displacement of the movable flange 2. Torque transmission from the shaft 3 via the cup 29 to the movable flange 2 is effected by the fixed bearing pad 43 in abutment with the associated groove 40. The other bearing pad 42 is pressed into engagement with its associated groove 40 by the force of the spring 45, there being a slight clearance provided between the underside of its head and the seat formed by the counterbore 36 to accommodate the inevitable clearance resulting from manufacturing tolerances. Thus, throughout operation, both bearing pads are pressed firmly into engagement with the grooves 40 so that the system can operate in rattle-free condition. As seen in FIG. 6, the driving torque is transmitted by the right-hand bearing pad 43 in clockwise driving rotation.

Figures 4, 9:
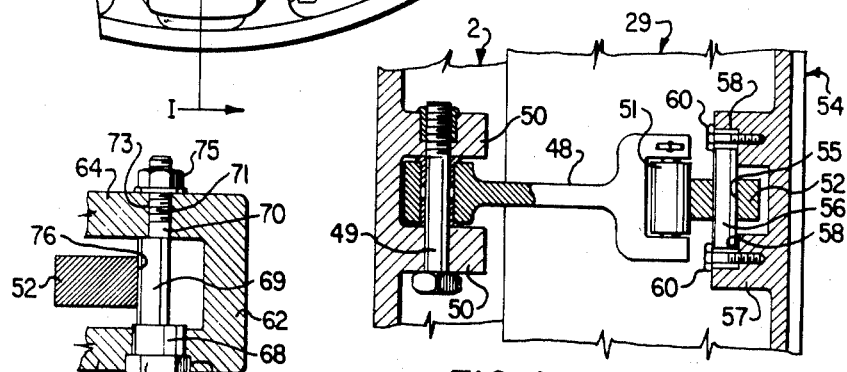
FIG. 4 is a fragmentary sectional view taken on the line IV—IV in FIG. 1.
FIG. 9 is a fragmentary sectional view taken on the line IX—IX in FIG. 8.

Axial displacement of the movable flange 2 with respect to the shaft 3 is controlled by centrifugal means 47 which are best shown in FIGS. 1 and 2. Three sets of centrifugal means 47 are provided at equal angular spacing around the axis of the shaft 3 and symmetrically arranged between the guidance means 34. Each comprises a weighted lever 48 pivoted on a pin 49 carried in bearing lugs 50 formed at the root of the skirt 7 on the rear of the movable flange 2. As shown in FIG. 4, the opposite end of the lever 48 is bifurcate and supports a roller 51 which cooperates with a profiled ramp element 52 carried in the cover 29 and extending generally radially with respect to the shaft 3. The front surface 53 of the ramp element 52 is profiled to a predetermined curvature and is presented towards and engaged by the roller 51.

The radially inner end of the ramp element 52 is carried in a stiff pivotal mounting 54 on the cup 29 as best seen in FIG. 4. More specifically, the end of the element 52 has a bore 55 which receives a compressible roll pin 56 of generally cylindrical form. The ends of the roll pin 56 are supported in a pair of lugs 57 projecting inwardly from the end of the cup 29. The inwardly directed side of each lug 57 is formed with an open-topped recess 58 which forms a seat for one end of the roll pin 56. The end of the roll pin is retained by a shoulder formed under the enlarged head of a screw 60 which is in threaded engagement with the lug. The roll pin 56 is received in the bore 52 in compressed condition and likewise, the ends of the roll pin are clamped by the screws 60. Thus, the inner end of the ramp element 52 is firmly supported on the cover 59 without backlash, and yet is capable of being pivoted in its mounting by a force sufficient to overcome the friction between the roll pin and the bore 55 or the recesses 58.

In the angular intervals between the locations of the ramp elements 53, the wall of the cup 29 is angled (as indicated at 61 in FIG. 1) to define at each location a generally triangular-shaped projecting shoulder 62. This shoulder provides a mounting for a means for adjustment of the orientation of the ramp element 52. More specifically, and as shown in FIG. 9, the shoulder 62 has opposed parallel walls 63, 64 which extend generally radially with respect to the shaft 3 and mount an adjuster element 65 which is shown to an enlarged scale FIG. 7. The element 65 comprises a hexagonal head 66 having an arrow 78 a contiguous cylindrical shank section 68, an eccentric pin 69, and a screw-threaded stud 71. The head, shank section 68, and stud 71 are coaxial, and the pin 69 is cylindrical and is eccentric with respect to the longitudinal axis of the element 65.

The adjuster element 65 is arranged in the shoulder 62 on an axis parallel to the axis of the roll pin 56, with the hexagonal head 66 received in a complementary hexagonal opening 72 in the wall 63, the threaded stud 61 extending through a bore 73 in the wall 64. Indicia 67 identify the different faces of the hexagonal opening 72. As shown in FIG. 9, the adjuster element 65 is secured in position by a nut 75 engaging the stud 71 and clamping the head 66 in the seat provided by the hexagonal opening 72. In the mounted condition, the eccentric pin 69 forms an abutment for the radially extending rear face 76 of the ramp element 52, as can be seen in FIG. 2.

It will be readily understood that the abutment position for the rear face 76 of the ramp element (as defined by the eccentric pin 69) will vary according to the angular orientation of the element 65 with respect to the hexagonal opening 72. By slackening the nut 75, advancing the element 65 axially to disengage the head 66 from the hexagonal opening 72, rotating the element 65 and reinserting it in the opening, the position of the eccentric 69, and thus the abutment provided for the rear face 76 of the ramp element 52 can be varied. In this connection it will be noted from FIG. 8 that the orientation of the hexagonal opening 72 with respect to a radial line 77 in a plane at right angle to the axis of the shaft 3 is asymmetrical so that for each of the six possible orientations of the hexagonal head 66 in the opening 72 (as registered by the datum indicator 78 in relation to the indicia 67) the extent to which the eccentric pin 69 projects in the axial direction of the shaft 3 is different. Thus the arrangement provides six different positions of adjustment of the abutment formed by the eccentric pin 69.

In operation, the arrangement of the parts when the drive pulley is stationary, or rotating at low speed is as shown in FIG. 1. The flanges 1 and 2 are spaced apart by their maximum distance as defined by abutment of the hub 8 with the spring seat 25. In this condition the spacing between the flanges 1 and 2 exceeds the width of the belt 6 so that at low speeds of rotation, no drive is imparted to the belt.

As the shaft 3 is rotated, it carries with it the cup 29 which drives the movable flange 2 through the torque transmitting and guidance means 34. Rotation of the movable pulley 2 generates a centrifugal force upon the weighted levers 48, and as the speed of rotation increases, so does this centrifugal force until it produces a reaction between the rollers 51 and the associated contoured front surfaces 53 of the ramps sufficient to overcome the compression force of the spring 24. When this condition is reached, further increase in the speed of rotation of the shaft will cause the levers 48 to pivot outwardly (clockwise as seen in FIG. 1), and thus, through reaction with the ramp elements 52, displaced the movable flange 2 towards the left. As a result of this displacement, the belt 6 will become engaged between the flanges 1 and 2 and will be constrained to follow the rotation thereof. Further increases in the speed of rotation will produce progressively greater displacement of the movable flange 2 towards the fixed flange 1 thereby moving the radius of contact between the belt and the flanges radially outwards to a greater diameter and thus varying the drive ratio between the pulley and the belt. The geometry of the centrifugal means, and in particular the location, length and orientation of the lever 48 in relation to the position of the ramp 52 and the form of its contoured front surface 53, is chosen to be such that, in relation to the characteristics of the spring 24, the resultant axial thrust on the movable flange 2 changes to maintain constant engine R.P.M. throughout the range of operation. In other words, once the movable flange 2 has been initialled into driving engagement with the belt 6, during further displacement of the flange 2, the increased thrust generated by the centrifugal means 47 is counteracted by the increased resistance of the spring 24 as it is compressed, so that the resultant thrust on the movable flange 2 changes throughout the drive ratio range from this threshold condition to the condition shown in FIG. 2.

For a given application, e.g., for use in a snowmobile transmission wherein the shaft 3 is the output shaft of the snowmobile engine, the dynamic characteristics of the drive pulley are matched to the performance characteristics of the engine. It is a characteristic of an internal combination engine that such an engine will develop its maximum horse power at a given rpm, the developed horsepower being less at higher or lower speeds of operation. Herein, this speed of rotation at which the maximum or rated horsepower of the engine is developed will be referred to as the "optimum rpm". It is desired to design a snowmobile transmission such that the engine, for the most part, will operate at the optimum rpm and therefore at maximum efficiency. The dynamic characteristics of the variable ratio drive pulley are therefore selected to ensure this result. Thus the engine operates more or less continuously at its optimum rpm, and variations in the load are accommodated by displacements of the movable flange 2 thus varying the transmission ratio between the shaft 3 and the snowmobile track.

For example, the variable ratio pulley as described above might be designed to operate with an engine series having a rated output of 50 horsepower at an optimum speed of 7,000 rpm. However not all engines in that series will develop the rated horsepower: due to manufacturing tolerances and other uncontrollable variants, some engines in the series might produce as much as two or three horsepower above or below the rated output. When such engines are coupled to a transmission having the above described variable ratio drive pulley calibrated to operate with an engine developing 50 horsepower at the optimum rpm of 7,000, the actual engine operating speed will respectively exceed or fall short of the optimum rpm by perhaps 200 or 300 rpm, and thus the engine will not operate at its most efficient speed. A similar effect is produced by variations in other elements of the drive train, e.g., the endless belt 6. Furthermore, the engine will only produce its rated power output at normal atmospheric pressure and will produce less power when operating at high altitudes, e.g. in mountains. The adjustment means described above enables fine tuning of the transmission, to compensate for such factors and enable the engine to operate at the optimum rpm. Thus, if in a given system the engine is found to operate at a speed above the optimum rpm, the adjuster element 65 is repositioned in the opening 72 so that the abutment formed by the eccentric pin 69 is incrementally advanced (to the left as seen in FIG. 1) altering the position of the ramp element 52 to provide an increased travel of the movable flange 2 towards the fixed flange 1 at a given speed of rotation and thus reduce the operating speed of the engine to the optimum rpm. Conversely, when the engine operating speed is below the optimum rpm, the adjuster element 65 is repositioned to reduce the travel of the movable flange 2 for a given speed of rotation and thus increase the operating speed of the egine to the optimum rpm.

It will be noted that this fine tuning adjustment can be affected very easily, and without disassembly of the drive pulley or the need for any additional or replacement components. The adjuster elements 65 are accessible for adjustment from the exterior of the cup 29. All that is necessary is to slacken the nut 75, advance the element 65 (downwards as shown in FIG. 9) to disengage the hexagonal head 66 from the hexagonal opening 72, rotate the element 65 to the desired position, reinsert it and retighten the nut 75. This can be accomplished very easily and rapidly, the position of adjustment being registered by the indicia 67 in relation to the datum indicator 78 so that the operator can readily ensure that all three elements 65 are in the same position of adjustment.

The described variable ratio drive pulley can readily be adapted for use with other engines and/or transmissions by replacement of the levers 48 and ramp elements 52 by corresponding components having different characteristics in terms of weights, configurations, etc.

The design described has a very low sliding resistance of the movable flange 2 as compared with designs known in the prior art. This is largely due to the arrangement of the torque transmitting and guidance means 34 which are positioned at a substantial radius from the shaft axis to ensure smooth sliding of the bearing 22 on the shaft section 23.

The components of the pulley can be made of any suitable materials. The flanges 1, 2 and the cup 29 may conveniently be fabricated as precision die-cast components in aluminum alloy, so that a minimum reworking of the assembly is necessary achieve the dynamic balance which is critical at the high operation speeds involved.

What we claim as our invention is:

1. A variable ratio drive pulley comprising: two opposed frusto-conical flanges arranged co-axially with respect to a drive shaft to rotate therewith and impart a variable ratio drive to a transmission belt arranged between the flanges;
one said flange comprising a fixed flange that is fixed axially relative to said shaft, and the other said flange being a movable flange that is movable axially of said shaft towards and away from said fixed flange;
biassing means operatively arranged between said shaft and said movable flange to urge the latter axially away from said fixed flange; and
centrifugal means acting between said movable flange and a part fixed relative to said shaft and responsive to rotation of said drive pulley to generate an axial thrust on said movable flange urging it towards said fixed flange, such axial thrust increasing with the speed of rotation until it reaches a value sufficient to overcome the force of said biassing means and displace said movable flange axially towards said fixed flange said centrifugal means being located within a casing defined by said movable flange and a cup enclosing the rear side of said movable flange;

wherein said pulley includes adjustment means engaging said centrifugal means and selectively settable to vary the axial thrust response characteristics of the pulley, said adjustment means being accessible for adjustment from the exterior of said casing.

2. A drive pulley according to claim 1 wherein said cup is fixed relative to said shaft.

3. A drive pulley according to claim 1 wherein said adjustment means is carried by said cup.

4. A drive pulley according to claim 1 wherein said shaft has a distal end projecting to the rear of said movable flange and supporting said cup to rotate therewith, said cup including torque transmitting means symmetrically arranged on the periphery thereof in axially slidable, non-rotatable engagement with said movable flange.

5. A drive pulley according to claim 4 wherein said centrifugal means comprises a plurality of ramps fixedly supported on one of said cup and said movable flange, and a corresponding number of weighted levers pivoted on the other of said cup and said movable flange and each arranged to engage and interact with a corresponding one of said ramps to generate axial thrust on said movable flange upon rotation of said pulley.

6. A drive pulley according to claim 5 wherein each ramp is adjustable in position in the plane of movement of the associated lever to vary its interaction therewith.

7. A drive pulley according to claim 5 wherein said ramps are mounted on said cup and said levers are pivotally mounted on said movable flange, each said ramp being adjustable in position in the plane of movement of the associated lever to vary the interaction therebetween.

8. A drive pulley according to claim 7 wherein each said lever and associated ramp lie in a plane generally radial to the axis of said shaft, said ramp having a radially inner end pivotally mounted on said cup and radially outer end supported on one face by an abutment on said cup, an opposite face of said ramp having a profiled surface, said lever being pivoted at one end on said movable flange and having at its opposite end a roller to engage said profiled surface.

9. A drive pulley according to claim 8 wherein said adjustment means comprises means for moving said abutment axially of said shaft to alter the orientation of said ramp.

10. A drive pulley according to claim 9 wherein said adjustment means comprises for each ramp an adjuster element mounted in said cup and extending tangentially with respect to the shaft axis, said adjusted element having a peripheral surface portion providing said abutment, angularly spaced regions of said peripheral surface portion being at varying distances from the axis of the adjuster element, and means for positioning said adjuster element selectively in any one of a plurality of angular orientations.

11. A drive pulley according to claim 10 wherein said means for positioning the adjuster element comprises a symmetrical noncircular opening in said cup, said adjuster element having a complementary section received in non-rotatable fashion therein in any of a plurality of angular orientations.

12. A drive pulley according to claim 10 wherein said peripheral surface portion of the adjuster element comprises a cylindrical pin which is positioned eccentrically with respect to the axis of the adjuster element.

13. A drive pulley according to claim 10 wherein said adjuster element is accessible for adjustment from the exterior of said cup.

* * * * *